(No Model.)
J. H. KINKEAD.
ROCK CRUSHING AND GRINDING APPARATUS.
No. 559,980. Patented May 12, 1896.
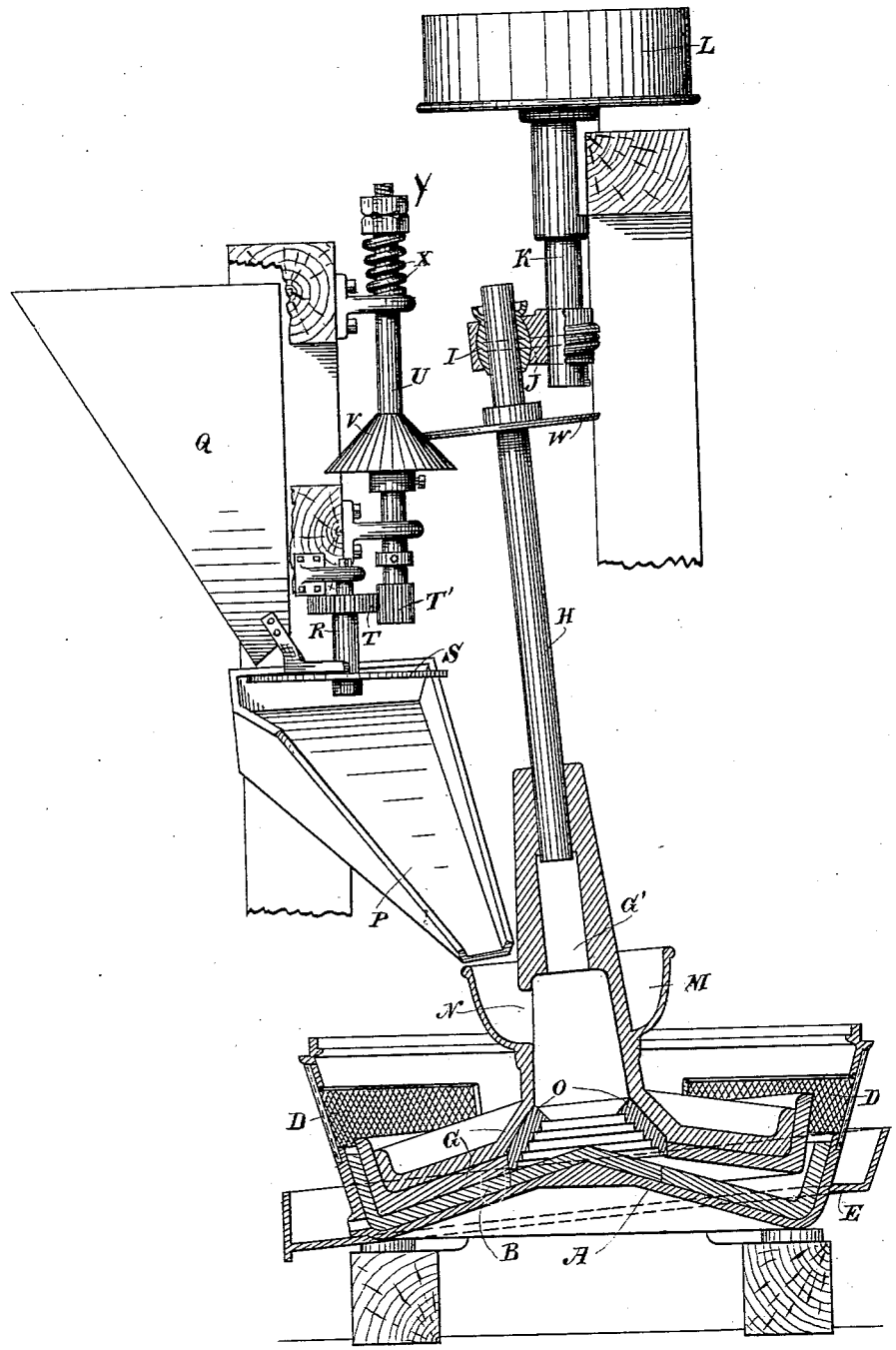

UNITED STATES PATENT OFFICE.

JAMES H. KINKEAD, OF VIRGINIA CITY, NEVADA.

ROCK CRUSHING AND GRINDING APPARATUS.

SPECIFICATION forming part of Letters Patent No. 559,980, dated May 12, 1896.

Application filed January 24, 1896. Serial No. 576,673. (No model.)

*To all whom it may concern:*

Be it known that I, JAMES H. KINKEAD, a citizen of the United States, residing at Virginia City, county of Storey, State of Nevada, have invented an Improvement in Rock Crushing and Grinding Apparatus; and I hereby declare the following to be a full, clear, and exact description of the same.

My invention relates to improvements in rock crushing and grinding apparatus and in mechanism for automatically feeding the material thereto.

It consists in certain details of construction which will be more fully explained by reference to the accompanying drawing, in which the figure is a view of my apparatus, the lower portion being shown in section.

The object of my invention is to provide a machine for the crushing and grinding of rock, and especially quartz and other valuable metal-bearing ores.

A is an iron pan having straight diverging sides and a conical bottom in the form of a flat cone with its apex centrally disposed upward within the pan, the surface of the cone being straight or so that radial lines from the apex to the periphery would intersect the surface from end to end.

B is an iron die having the same shape as the interior of the pan and secured therein by bolts, wedges, or other devices, so as to be removable whenever too much worn for use. Around the sides of the pan above the die is fixed a screen or screens D, there being as many screen-openings at intervals around the circumference as may be desired for the escape of the pulverized material when it is fine enough to pass the meshes of the screen, and this material falls into a sluice or channel E, which is cast or fixed around the periphery of the pan and is discharged therefrom as desired.

G is a muller or grinder having sides and bottom similar in shape to the interior of the pan; but the concavity of the bottom of the muller is less than the convexity of the pan-bottom, so that if the muller was set accurately in the center of the pan its outer periphery would not touch the bottom nor would its sides touch the sides of the pan. This muller or grinder has a central cone extending upwardly, and in the top of the cone is fixed a shaft H, which extends up a short distance and is connected by a universal or ball joint I with a crank J, which is fixed to a vertical driving-shaft K. This shaft K is in line directly above the apex of the pan-cone. A pulley L upon the upper end of the shaft gives motion to it and its crank, and this carries the upper end of the shaft H in a circle around the driving-shaft with a gyratory motion. This motion is communicated to the muller or grinder and gives it a rolling motion, which brings all parts of its bottom successively into contact with the conical bottom of the pan with a rolling motion, which, by reason of the weight of the grinder or muller, will pulverize the ore as it passes between the bottom of the grinder and the die B, which lines the bottom of the pan.

In order to deliver the material to be crushed into the space between the grinder and the pan-bottom, I have shown the cone G' made hollow in the lower part, and it has cast with or fixed to it an annular bowl-shaped hopper M. An opening N is made in the side of the cone G', and through this any ore which is delivered into the bowl will pass down through the lower part of the cone G' and be delivered upon the conical bottom of the pan or its lining die. The lower part of the interior of the cone G' diverges at an angle which is intermediate between that of the grinding-surface of the bottom of the muller and the upper part of the cone, and within this portion is fixed a supplemental ring, die, or shoe O, the interior of which is formed in a series of steps or ledges, increasing successively in diameter from the top downward. This corrugated ring or shoe being fixed upon the interior of the muller, as shown, it will be seen that when the latter is caused to roll around upon the bottom of the pan, as previously described, these corrugations will partake of the same movement, and will thus be brought successively nearer to the central conical portion of the pan-bottom. The weight of the muller is such that these corrugations will act as breakers to crush and break the larger portions of ore to such a degree of fineness that they will gradually pass between the bottom of the muller and the bottom of the pan, where the continuous rotation of the muller finally pulverizes the material until it is fine enough to pass through the screens, the pulverizing taking place all along the bottom and up between the diverging sides of the die and the muller.

In order to feed the ore automatically to this device, I have shown a delivery-spout P, the lower end of which is so disposed as to discharge into the annular bowl M. Above this spout is the hopper Q, into which the ore is dumped.

Upon one side, near the lower end of the hopper, is journaled a vertical shaft R, which has a flat circular disk S, fixed to its lower end. The diameter of this disk is such that its periphery stands beneath the opening at the lower end of the hopper, so that ore passing out of this opening will rest upon the disk S. In order to discharge this ore, the disk S is rotated, and by means of a scraper projecting over it from the side of the hopper or other convenient support the ore will be forced off the edge of the disk as the latter rotates and will fall into the chute P, through which it is delivered into the bowl M, thence through the interior of the cone G', to pass under the corrugated crushing-ring, and eventually between the muller and the die of the pan.

The rotation of the disk S is effected by power applied intermittently from the gyrating shaft by intermediate mechanism. In the present illustration it operates as follows: Upon the vertical shaft R is a gear-wheel T, and this is engaged by a pinion T', which is fixed upon a second vertical shaft U, suitably journaled with relation to the shaft R to insure the meshing of the gear and pinion T T'. A cone V is fixed upon the shaft U at such a point with relation to the shaft II that the latter approaches the cone at each revolution of the crank which drives it. Upon the shaft II is fixed a disk W, the diameter of which is such that its periphery will form contact with the surface of the cone V whenever by reason of there being a small quantity of ore in the pan the muller, its shaft, and the disk W have settled down low enough to allow of such a contact. Whenever this contact takes place it will be manifest that the friction of the disk W against the cone V will turn the latter a little way during the brief contact, and this will act through the pinion T' and gear T to rotate the shaft R and the disk S. Whenever the supply of ore is sufficient to raise the muller a little the disk W will be raised so high that it will not contact with the cone V, and the feeding will cease until the supply in the pan has again decreased enough to allow of contact between the disk W and the cone V.

X is a spring surrounding the shaft U above one of its bearing or journal boxes, and by means of adjusting-nuts Y the shaft is raised or depressed in its journals to bring the cone V to the proper position relative to the disk W, so that it will feed as rapidly as the character of the ore requires. If for any reason the contact between the disk and the cone is too violent, the spring will yield and allow the cone and its shaft to slip downward as the disk passes over it.

The length of the pinion T' is sufficient to keep it in mesh with the gear T whatever may be the vertical movement of its shaft. Suitable collars or adjusting-nuts at either end of this shaft serve to limit its vertical motion.

Having thus described my invention, what I claim as new, and desire to secure by Letters Patent, is—

1. An improved crushing and grinding apparatus consisting of a pan having a conical bottom declining outwardly from the center and diverging sides extending upwardly from the periphery of the bottom, a pan-shaped muller having a conical bottom and diverging sides extending upwardly from its periphery, the bottom having a concavity slightly less in depth than the corresponding convexity of the bottom of the pan, a hollow cone extending upwardly from the center of the muller having an opening or openings in the side, an annular bowl surrounding the cone below the openings adapted to receive the ore and deliver it through the openings into the interior of the cone, a preliminary corrugated crusher fixed within the lower part of the cone, a shaft extending upwardly from the top of the cone, and a horizontally-rotating crank with which the upper end of the shaft is connected whereby a gyratory motion of the muller and crusher is produced.

2. A crushing and grinding apparatus consisting of a pan having a conical bottom inclining outwardly from the center, diverging upwardly-extending sides, a correspondingly-shaped muller, the concavity of the bottom being slightly less in depth than the corresponding convexity of the pan-bottom, a hollow cone extending upwardly from the center of the muller having a die fixed within it surrounding the center of the conical pan-bottom and having corrugations or steps formed upon its lower surface, openings in the side of the cone above the corrugated ring, a bowl surrounding the cone to receive the material to be crushed and deliver it through the openings to the crushing-surfaces, a shaft extending upward from the top of the cone, a vertical shaft and means for rotating it situated above the pan and in line with its vertical axis, a crank fixed upon said shaft, a universal-joint connection between the crank and the top of the muller-shaft whereby a gyratory motion of the muller is produced by the rotation of the driving-shaft, a disk fixed upon the muller-shaft and a feed mechanism with which the disk makes contact at each revolution of the crank.

3. The combination with a pan and a gyratory muller and muller-shaft of a disk fixed to the gyrating muller-shaft, a cone fixed to a vertical shaft so that the disk forms contact with and turns it at each contact, a hopper adapted to receive the ore and having a discharge-opening at the bottom, a disk fixed to a rotary vertical shaft so that its periphery stands beneath the discharge-opening of the hopper, and connections between it and the cone-carrying shaft whereby the disk is advanced with each movement of the cone-shaft, and a portion of ore is delivered from the hopper to the crushing apparatus.

4. A crusher and grinder consisting of a stationary pan a gyrating muller with a shaft and a crank by which it is gyrated over the bottom of the pan, an ore-receiving hopper fixed near the gyrating shaft, a horizontal disk fixed to a vertical shaft with its periphery beneath the discharge-opening of the hopper, a gear-wheel fixed upon the disk-shaft, a second vertical shaft journaled parallel with the disk-shaft having a pinion upon it engaging with the gear-wheel, a cone fixed to this shaft and a disk fixed to the gyrating muller-shaft so as to form contact with and rotate the cone at each gyration of the muller-shaft, adjusting nuts or collars upon the cone-shaft, and a spring whereby the cone-shaft is allowed to yield in the direction of its length to relieve the contact between the cone and the disk.

In witness whereof I have hereunto set my hand.

JAS. H. KINKEAD.

Witnesses:
B. G. HAAS,
L. W. BERRY.